Figure 1:
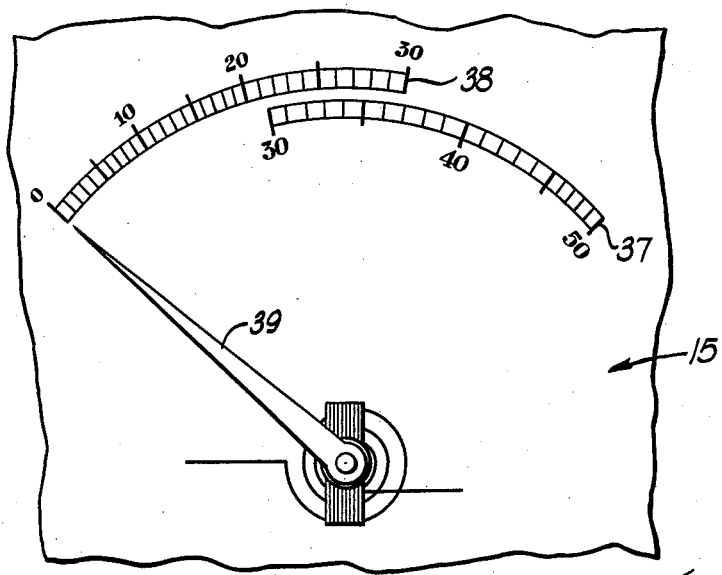

Dec. 25, 1962 R. R. MOORE ET AL 3,070,746
OHMMETER CIRCUIT FOR MOISTURE TESTING
Original Filed June 14, 1956

INVENTORS
ROBERT R. MOORE
BY AND LESTER R. RABB

Mason, Kolehmainen, Rathburn and Wyss
ATTORNEYS

United States Patent Office 3,070,746
Patented Dec. 25, 1962

3,070,746
OHMMETER CIRCUIT FOR MOISTURE TESTING
Robert R. Moore, Glenview, and Lester R. Rabb, Woodstock, Ill., assignors to Moore-Milford Corporation, Skokie, Ill., a corporation of Illinois
Continuation of application Ser. No. 591,358, June 14, 1956. This application Dec. 15, 1959, Ser. No. 859,677
7 Claims. (Cl. 324—65)

This invention relates to moisture testing by the resistance method as, for example, described in U.S. Patent No. 2,759,148, issued August 14, 1956, to A. O. Store.

The present application is a continuation of copending application, Serial No. 591,358, filed June 14, 1956, now abandoned, and assigned to the same assignee as the present invention.

In commercial development of these systems, nonlinear single scale current meters first were used which had to be individually calibrated to be sufficiently accurate for moisture testing. Subsequently, linear meters were used with certain practical advantages, but as the commercial exploitation of the arrangements shown by the two identified applications developed it has become highly desirable to extend the ranges of current meter indication wherein indication of differences in moisture values are sufficiently interpretable to be useful in moisture testing. Such development has involved provision of a commercially obtainable, linear meter, as of standard zero to 100 microampere full deflection range, with a pair of scales each assigned to a different range of resistances, with the scales overlapping at an intermediate point, with such circuitry as to provide such meter deflection characteristics as will permit assignment of those scales, in combination, with a substantial resistance variation range, say 5000 ohms to 250 megohms, but assigning to the different scales such ranges as to provide for characteristics of deflection degree per unit change of current that throughout the different ranges of currents assigned to the respective scales permit reading interpretation suitable for moisture testing. It is therefore an object of the present invention to provide an improved moisture testing ohmmeter circuit having an ammeter with an indicating dial calibrated in two different scales respectively representing high and low ranges of measurable resistance values.

A further object is to provide an improved multiple range moisture testing ohmmeter circuit having multiple scales which permit reading interpretation suitable for moisture testing throughout the different ranges of currents assigned to the respective scales.

Further objects and advantages of the present invention will become apparent as the following description proceeds, and the features of novelty which characterize the invention will be pointed out with particularity in the claims annexed to and forming a part of this specification.

Briefly stated, a multiple range moisture testing circuit according to the present invention includes an ammeter having an indicating dial calibrated in two different scales respectively representing high and low ranges of resistance values to be measured. A first circuit for measuring low resistance values and for obtaining a reading on the low resistance scale includes a voltage source, a principal resistor, and terminal means for connection to a pair of spaced probes, all serially connected, and further includes a low resistance of lower value than the principal resistance connected across the ammeter in parallel therewith. A second circuit for measuring high resistance values includes the voltage source, a second principal resistor of higher value than the first principal resistor and the terminal means serially connected for obtaining a reading on the high resistance scale of the ammeter. In the circuit for measuring high resistance values, the low resistance across the ammeter used in the circuit for measuring low resistance values is rendered ineffective.

One preferred embodiment of the present invention also includes a series circuit of a fixed resistor and a variable resistor serially conected between the first principal resistor and the ammeter; the variable resistor being adjustable to displace the scale reading of the ammeter. Moreover, a voltage dividing variable resistor may be connected across at least the ammeter for adjusting the circuit for variations in voltage and for initially zeroing the circuit. Another variable resistor may be included in the above-mentioned low resistance across the ammeter to permit contraction or expansion of the scale reading. Means may also be included for shorting across the probe terminals in order to zero the circuit for changes in voltage.

In the described embodiment, the ammeter has an indicating dial calibrated in two different scales respectively representing high and low ranges of resistance values and is provided with a needle movable over the dial linearly in response to current flow through the ammeter from a low resistance position through an intermediate position to a high resistance position. The low resistance range scale extends from the low resistance position of the needle to the intermediate position. The high resistance range scale only partially overlaps the low resistance and extends through the intermediate position of the needle to the high resistance position.

Figure 2:
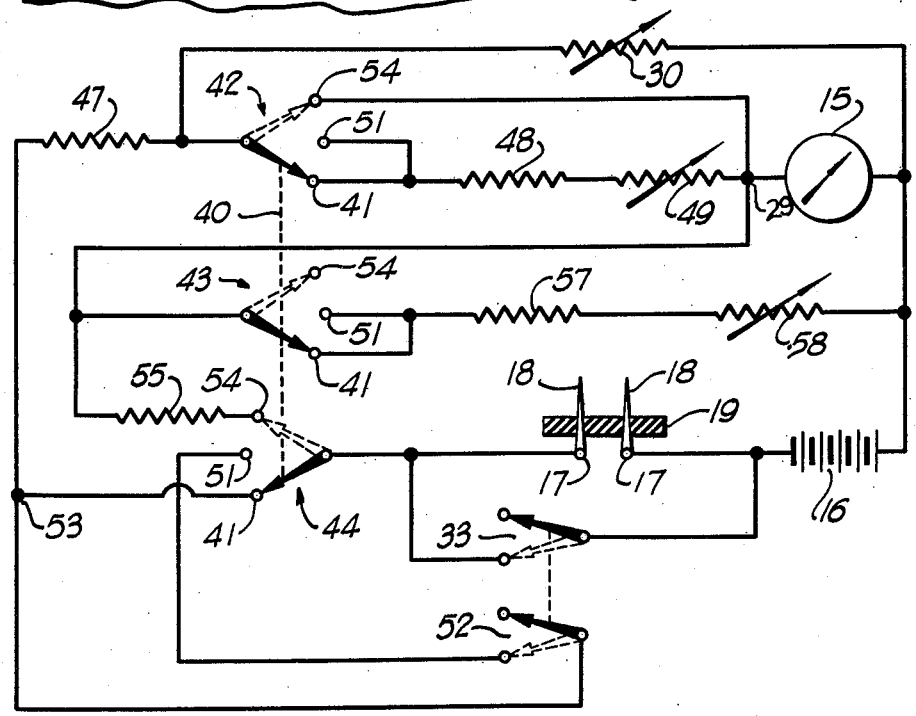

In the accompanying drawing:

FIG. 1 is a partly schematic fragmentary elevation of an ammeter showing the dial calibration that is preferred in practicing the invention; and FIG. 2 is a schematic diagram of a preferred circuit arrangement embodying the invention.

Describing the drawing in detail, it will be seen that the assembly includes a current meter or ammeter 15, a voltage source 16, here shown as a battery, a pair of circuit terminals 17 that are provided for connection to test electrodes, shown as the pair of spaced probes 18, in and projecting from an insulating support body 19.

The system is one wherein two resistance systems of different values are rendered effective by connecting them in the arrangement that will be explained, with the meter 15, respectively to render two different ranges of values of resistance connected across terminals 17, readily and accurately interpretable on the different ones of a pair of scales of meter 15. The different ranges of values of resistance connected across terminals 17 represents different range of resistances of the material whose moisture is to be tested.

The system is arranged to provide for selective conversion of the assembly, by a single switch manipulation, to any one of a plurality of conditions including a neutral condition wherein no voltage is applied to circuit terminals 17 and two operating conditions respectively assigned to and arranged for indicating different ranges of resistances connected between terminals 17. The desired condition is controlled by the position of a triple pole-triple throw switch, the poles of which are represented by numbers 42, 43 and 44. The poles 42, 43 and 44 are simultaneously positioned by manipulation of an interconnecting actuator rod 40.

The meter 15 includes a first or lower resistance scale 37 representing lower values of resistances across terminals 17 and a second or upper resistance scale 38 representing higher values of resistance across terminals 17. The lower resistance scale 37 of meter 15 is calibrated in a series of arbitrarily selected points to which the calibration numerals "30" to "50" are assigned. To these lower resistance scale points are assigned numbers of ohms in accordance with an imaginary scale of such length that a large portion of scale 37, extending well into the extreme low resistance portion, has such a distribution of numbers of ohms that differences in deflections of a meter indicator, needle 39, corresponding to differences in resistance values that are significant in moisture content ascertainment, are accurately interpretable.

The apparently random irregularity of the scale division points is due to their arbitrary location to coincide with the locations at which fall reasonably round numbers of ohms and to provide division point locations that are spaced at reasonably uniform distances. Selected division points of scale 37 will have the following numbers of ohms.

Scale 37

| Division point number: | Number of ohms (across terminals 17 in thousands) |
|---|---|
| 50 | 0 (theoretical) |
| 49 | 5 |
| 48 | 11 |
| 47 | 18 |
| 46 | 26 |
| 45 | 36 |
| 44 | 47 |
| 43 | 60 |
| 35 | 240 |
| 34 | 275 |
| 33 | 315 |
| 32 | 360 |
| 31 | 410 |
| 30 | 465 |

The following numbers of ohms are applied to the indicated selected points of scale 38, which again are located to be spaced with reasonable uniformity and at locations of reasonably round numbers of ohms.

Scale 38

| Division point number: | Number of ohms (across terminals 17 in thousands) |
|---|---|
| 30 | 465 |
| 29 | 525 |
| 28 | 590 |
| 27 | 660 |
| 26 | 735 |
| 25 | 817 |
| 24 | 900 |

| | Megohms |
|---|---|
| 23 | 1 |
| 6 | 6.7 |
| 5 | 8 |
| 4 | 10 |
| 3 | 13.3 |
| 2 | 20 |
| 1 | 40 |
| 0 | 250 |

Sacle 37 is assigned to the lower range of five to 465 thousand ohms and scale 38 is assigned to the upper range of 465 thousand ohms to 250 megohms.

With the switch poles 42, 43 and 44 in their lower position in contact with terminals 41 as shown in FIG. 2, the ohmeter circuit is connected to indicate the lower range of resistance to be read on the lower resistance scale 37. The resistance system of this lower range forms a series circuit including the voltage source 16, the spaced electrodes 18, the meter 15, a first fixed principal resistor 47 of relatviely low value, for example, of 250,000 ohms, a second fixed resistor 48 of much smaller value, for example, of 820 ohms, and a factory-adjustable variable resistor 49 also of low value, for example, of 500 ohms maximum, the function of which will be more fully hereinafter described. A branch circuit, including a fixed resistor 57 of low resistance, for example, 680 ohms, and a serially connected factory adjustable variable resistor 58, the function of which will be more fully hereinafter described, is connected across the current meter 15, in parallel therewith by the switch pole 43. The resistance of this branch circuit is also small compared to the resistance of the principal resistor 47.

In the low resistance range or neutral condition, a voltage-dividing variable resistance device 30 of maximum value that is low as compared to the value of the principal resistance 47 but high as compared to the combined resistance value of resistors 48, 49, say 5000 ohms, is connected across the series circuit including the latter two resistances and the meter 15 so as to be in parallel therewith. This resistor 30 is provided for standardizing the meter current by adjustment thereof while circuit terminals 17 are short-circuited, and selector switch poles 42, 43 and 44 are in either their low resistance range in contact with terminals 41 or in the neutral condition selecting position in contact with terminals 51, as more fully hereinafter described.

The center contacts 51 of selector switch poles 42, 43, 44 are assigned to the neutral condition of the instrument. While the contactors of the selector switches are closed with contacts 51, voltage is blocked from terminals 17 by a second normally open standardization switch 52 ganged to a normally open switch 33 and series connected between contact 51 of switch pole 44 and a junction point 53 between contact 41 of switch 44 and resistance 47. When switches 52 and 33 are closed, the contacts 17 and probes 18 are shorted across so that there is effectively zero resistance across the terminals 17. Thus, while switch poles 42, 43, 44 are in their "neutral" positions, standardization can be accomplished by closing the switches 33, 52, thereby establishing an adjustment condition hereinafter described.

The remaining positionally corresponding contacts 54 of switch poles 42, 43, 44 are assigned to the high resistance range of the instrument, wherein a principal resistor 55 of relatively high value, say 750,000 ohms, is series connected by switch pole 44 between terminals 17 and meter terminal 29, while closing of the contacts of switch 42 with its contact 54 connects the variable voltage adjustment device in parallel with meter 15 and in series with the principal resistor 55 of the high resistance range circuits. The high resistance range therefore includes the series circuit of the voltage source 16, the probes 18, the resistance 55, and the meter 15, with the resistor 30 connected across the meter 15 in parallel therewith.

It may be noted that long experiment was necessary in evolving the two resistance systems 47, 48, 49, and 55, 47, 58 as productive of two resistance ranges respectively corresponding to calibration of the two meter scales 37, 38, and of sufficient accuracy to be interpreted sufficiently intelligibly and accurately for moisture testing purposes. Effort to provide for standardization at intermediate corresponding points of the overlapping scales, as on points "30" of each, with the object of providing common standardization effective for both scales, were entirely unsatisfactory, quite possibly due to relative resistance values of the resistances of the two range systems and that of device 30. The system disclosed has proved highly successful, particularly since, in the low resistance, high moisture content portions of the low resistance range, variation of a few ohms result in relatively large deflections of the meter indicator, so that accurate standardization of the low resistance range of the meter is highly desirable.

With the foregoing explanation of the concepts underlying the arrangement of the dual scale meter 15, the circuit arrangement that is cooperative with the meter may be explained. The tester is factory-adjusted by connecting a 465K ohm resistor across the terminals 17 and then adjusting the upper scale 38 to read exactly 30 divisions by adjustment of the variable resistor 30. The lower resistance scale 37 is then adjusted to read its correct values by means of variable resistors 49 and 58. Adjustment of the variable resistor 58 contracts or expands the scale reading, while adjustment of the variable resistor 49 displaces the scale to give the proper positioning of the scale readings with reference to the resistance across the terminals 17. When switches 33 and 52 are closed, the resistance across the terminals 17 is zero and the low resistance scale can be adjusted to read "50." Once the circuit has been adjusted to give the correct scale readings on the meter 15 as described above, either scale 37 or 38 will be in calibration as long as the same voltage is obtained from the voltage source 16. As the battery voltage drops with age, the variable resistance 30 may be adjusted by closing the switches 33 and 52 with the switch poles 42, 43 and 44 in the lower resistance range or neutral condition and adjusting the resistance 30 so that the meter will read "50" or zero resistance.

For energizing the meter to operate in the lower resistance range, to measure resistances of test materials contacted by electrodes connected with circuit terminal 17, as 18, and for indication by the lower resistance scale 37 of meter 15, positionally corresponding contacts 41 of the triple throw selector switch poles 42, 43, 44 are assigned to that range, so that when the movable contactors of these switch poles, which are ganged, are thrown to close with these contacts, the lower resistance range of the instrument is established. The low resistance range includes the series circuit of the relatively small principal resistor 47 (as compared to the principal resistor 55) in series with the parallel circuit, one branch of which includes the meter 15 and the other branch which includes the resistances 57 and 58, and in series with the probes 18 and voltage source 16, thereby producing a needle 39 deflection on the lower resistance scale 37 that is large in relation to the unit change in resistance across the probes 18. The relatively large needle deflection in this range is important to indicate small changes in resistance where the small changes are significant.

The positionally corresponding contacts 54 are assigned to the upper resistance range, as shown in phantom in FIG. 2. The circuit includes a relatively large principal resistor 55 in series with the meter 15, probes 18, and voltage source 16, with the variable resistor 30 connected across the meter 15. In this circuit, a unit change in resistance across the probes 18 produces a correspondingly smaller deflection of the needle 39 than in the lower resistance range.

The multiple range moisture testing ohmmeter circuit according to the present invention provides meter scale readings which permit reading interpretation throughout the different ranges of currents assigned to the respective scales which is suitable for moisture testing, and further provides a wide total range of measurable resistance values which represent measurable moisture readings over a wide range of moisture content and material resistance.

While a specific embodiment of the present invention has been described, many modifications will occur to those skilled in the art, and the true spirit and scope of the invention is described in the claims annexed to and forming a part of this specification.

What is claimed as new and desired to be secured by Letters Patent of the United States is:

1. A multiple range moisture testing ohmmeter circuit comprising an ammeter having an indicating dial calibrated in two different scales respectively representing high and low ranges of resistance values and having an indicating needle movable over said dial linearly in response to current flow through the ammeter from a low resistance position through an intermediate position to a high resistance position, the low resistance range scale extending from the low resistance position of the needle to the intermediate position and the high resistance scale only partially overlapping the low resistance range scale and extending through the intermediate position of the needle to the high resistance position, a voltage source, means adapted for connection to a pair of spaced electrodes, a first principal resistor, a second principal resistor of higher resistance than said first-mentioned resistor, resistance means of relatively smaller resistance than said first-mentioned resistor, circuit means for connecting said ammeter, voltage source, first-mentioned means and first-mentioned resistor in a series circuit and simultaneously connecting said resistance means across said ammeter to form a parallel path with said ammeter for the current flow through said first-mentioned resistor, a low resistance across said electrodes producing a needle deflection between said low resistance position and said intermediate position corresponding to the value of said low resistance, and circuit means for connecting said ammeter, voltage source, first-mentioned means, and second principal resistor in a series circuit and simultaneously electrically disconnecting said resistance means from the circuit so that a high resistance across said electrodes produces a needle deflection between said intermediate position and said high resistance position.

2. A multiple range moisture testing ohmmeter circuit as set forth in claim 1 above and including a voltage dividing variable resistor connected across at least said ammeter.

3. A multiple range moisture testing ohmmeter circuit comprising an ammeter having an indicating dial calibrated in two different scales respectively representing high and low ranges of resistance values and having an indicating needle movable over said dial linearly in response to current flow through the ammeter from a low resistance position through an intermediate position to a high resistance position, the low resistance range scale extending from the low resistance position of the needle to the intermediate position and the high resistance scale only partially overlapping the low resistance range scale and extending through the intermediate position of the needle to the high resistance position, a voltage source, means adapted for connection to a pair of spaced electrodes, a first principal resistor, a second principal resistor of higher resistance than said first-mentioned resistor, first resistance means of relatively smaller resistance than said first-mentioned resistor and including at least a variable resistor for expanding and contracting the scale reading, second resistance means of relatively smaller resistance than said first-mentioned resistor and including at least a variable resistor for displacing said scale reading, circuit means for connecting said ammeter, voltage source, first-mentioned means, first mentioned resistor and said second resistance means in a series circuit and simultaneously connecting said first-mentioned resistance means across said ammeter so that a low resistance across said electrodes produces a needle deflection between said low resistance position and said intermediate position corresponding to the value of said low resistance, and circuit means for connecting said ammeter, voltage source, first-mentioned means, and second principal resistor in a series circuit so that a high resistance across said electrodes produces a needle deflection between said intermediate position and said high resistance position.

4. A multiple range moisture testing ohmmeter circuit as set forth in claim 3 above wherein said voltage source is a battery and additionally including a voltage dividing variable resistor and wherein said first-mentioned circuit means includes means for connecting said last-mentioned resistor across said ammeter and said last-mentioned resistance means, and wherein siad last-mentioned circuit means includes means for connecting said last-mentioned resistor across said ammeter.

5. A multiple range moisture testing ohmmeter circuit comprising an ammeter having an indicating dial calibrated in two different scales respectively representing high and low ranges of resistance values, a voltage source, means adapted for connection to a pair of spaced electrodes, a first principal resistor, a second principal resistor of higher resistance than said first-mentioned resistor, resistance means of relatively smaller resistance than said first-mentioned resistor and including at least a variable resistor, means including switch means for connecting said ammeter, voltage source, first-mentioned means, and first-mentioned resistor in a series circuit and simultaneously connecting said resistance means directly across said ammeter in parallel therewith for measuring a low resistance value across said probes, and means including said switch means for connecting said ammeter, voltage source, first-mentioned means, and second principal resistor in a series circuit for measuring a high resistance value across said probes.

6. A multiple range moisture testing ohmmeter circuit comprising an ammeter having an indicating dial calibrated in two different scales respectively representing high and low ranges of resistance values, a voltage source, means adapted for connection to a pair of spaced electrodes, a first principal resistor, a second principal resistor of higher resistance than said first-mentioned resistor, resistance means of relatively smaller resistance than said first-mentioned resistor and including at least a variable resistor adjustable to expand and contract the scale reading, a second resistance means of relatively smaller resistance than said first mentioned resistor and including at least a variable resistor adjustable to displace the scale reading, circuit means including switch means for connecting said ammeter, voltage source, first-mentioned means, said first-mentioned resistor and said last-mentioned resistance means in a series circuit and simultaneously connecting said first-mentioned resistance means directly across said ammeter in parallel therewith for measuring a low resistance value across said probes, and circuit means including said switch means for connecting said ammeter, voltage source, first-mentioned means, and second principal resistor in a series circuit for measuring a high resistance value across said probes.

7. A multiple range moisture testing ohmmeter circuit as set forth in claim 6 above wherein said voltage source is a battery and additionally including a voltage-dividing variable resistor and wherein said first-mentioned circuit means includes means for connecting said last-mentioned resistor across said ammeter and said last-mentioned resistance means, and wherein said last-mentioned circuit means includes means for connecting said last-mentioned resistor across said ammeter.

References Cited in the file of this patent
UNITED STATES PATENTS
2,654,054   Morelock _____ Sept. 29, 1953

OTHER REFERENCES

Bailey: "Ohmmeter Reads to 300 Megohms," Radio-Electronics, April 1949; pages 55–56.

Crowhurst: "High Accuracy Ohmmeter," Radio-Electronics, August 1954; pages 36–38.